United States Patent [19]

Poline

[11] Patent Number: 5,010,288
[45] Date of Patent: Apr. 23, 1991

[54] VECTOR CONTROL SYSTEM FOR A SQUIRREL-CAGE ASYNCHRONOUS ELECTRIC MOTOR

[75] Inventor: Pierre Poline, Trevoux, France

[73] Assignee: GEC Alsthom SA, Paris, France

[21] Appl. No.: 496,703

[22] Filed: Mar. 21, 1990

[30] Foreign Application Priority Data

Mar. 21, 1989 [FR] France ................................ 89 03685

[51] Int. Cl.$^5$ ............................................ H02P 5/28
[52] U.S. Cl. ..................................... 318/811; 318/803; 318/807
[58] Field of Search .............................. 318/702–820; 363/41, 40, 43

[56] References Cited

U.S. PATENT DOCUMENTS

| | | | |
|---|---|---|---|
| 4,418,308 | 11/1983 | Bose | 318/803 |
| 4,437,051 | 3/1984 | Muto et al. | 318/811 X |
| 4,450,398 | 5/1984 | Bose | 318/806 X |
| 4,459,534 | 7/1984 | Nagase et al. | 318/803 X |
| 4,626,761 | 12/1986 | Blaschke | 318/803 |
| 4,724,373 | 2/1988 | Lipo | 318/806 X |
| 4,757,248 | 7/1988 | Fujioka et al. | 318/807 |
| 4,763,058 | 8/1988 | Heining et al. | 318/807 |
| 4,767,976 | 8/1988 | Mutoh et al. | 318/807 X |
| 4,777,422 | 10/1988 | Slicker et al. | 318/808 X |
| 4,785,225 | 11/1988 | Horie et al. | 318/811 |
| 4,800,327 | 1/1989 | Fujioka et al. | 318/811 X |
| 4,808,903 | 2/1989 | Matsui et al. | 318/800 |
| 4,823,066 | 4/1989 | Yoshiki et al. | 318/811 |

FOREIGN PATENT DOCUMENTS 3221906 12/1983 Fed. Rep. of Germany .
3438210 4/1986 Fed. Rep. of Germany .
3523665 1/1987 Fed. Rep. of Germany .

OTHER PUBLICATIONS

Patent Abstracts of Japan, vol. 6, No. 226 (E-141) (1104), Nov. 11, 1982, & JP-A-57 129190 (Meidensha), Aug. 11, 1982.

Primary Examiner—Paul Ip
Attorney, Agent, or Firm—Sughrue, Mion, Zinn, Macpeak & Seas

[57] ABSTRACT

A vector control system for a squirrel-cage asynchronous motor powered by a width-modulated pulse generator, the system including a device for evaluating the modulus and the phase of at least one of the fluxes in the motor relative to a fixed frame of reference, and a device for evaluating first in-phase and quadrature components, relative to the flux of at least one of the currents supplied to the motor. The system also includes means a device for determining second in-phase and quadrature components relative to the flux in the motor, defining a control voltage as a function at least of the first components and of a requested torque value, together with means a device for converting the second components into a corresponding polar representation having a modulus and an argument, for the purpose of controlling the pulse generator.

4 Claims, 2 Drawing Sheets

VECTOR CONTROL SYSTEM FOR A SQUIRREL-CAGE ASYNCHRONOUS ELECTRIC MOTOR

The present invention relates to a vector control system for a squirrel-cage asynchronous electric motor, the motor being powered by a generator of width-modulated pulses controlling an inverter which converts a DC voltage into at least one AC feed voltage for the asynchronous motor.

BACKGROUND OF THE INVENTION

In locomotives having electric motors, it has become common practice to use asynchronous motors. One or more motors are powered by an inverter providing three-phase AC at the required frequency and itself powered from a DC source, with the DC optionally being obtained by rectification.

The required frequency is determined from the speed of rotation of the motor. When it is greater than the frequency which corresponds to the speed of rotation of the motor, slip occurs between the rotor and the flux in the motor, thereby generating torque which tends to accelerate rotation of the rotor. When the frequency is no greater than the frequency which corresponds to the speed of rotation of the motor, then the motor is braked.

When the locomotive is running at high speed, motor control by means of a torque-controlling handle therefore consists essentially in adjusting the frequency generated by the inverter as a function of the difference observed between the requested torque and the motor torque, and this difference is evaluated on the basis of the current and the voltage supplied to the motor. The voltage supplied to the motor, referred to as "fullwave voltage" is then constant, and its peak value is equal to $2/\pi$ times the DC voltage of the source. The inverter operates merely as a reversing switch at the frequency set by a frequency control.

At low speed, the voltage must be reduced in order to control the flux in the motor so as to minimize losses in the motor and in the inverter. Motor control then requires not only the frequency to be adjusted as mentioned above, but also the AC voltage supplied to the motor to be adjusted. The inverter thus receives, in addition to its frequency control signal, a control signal for modulating the voltage to be supplied, and in response to these two control signals, it operates in chopper mode. The inverter control circuit generates width-modulated pulses which, when integrated, produce a sinewave voltage at the required frequency and at the requested reduced amplitude.

In practice, the inverter itself is essentially constituted by power switches and is separate from its control circuit which receives and processes the above-mentioned control signals and delivers trigger signals to the power switches. Given that its main function is to produce trigger signals for width-modulated pulses, this control circuit is referred to below as a pulse modulator.

The invention relates more particularly to the control system which generates the frequency control signals together with the voltage modulus or voltage magnitude control signals for delivery to said pulse modulator under low-speed conditions.

Such control systems are known. A discussion on this topic is to be found in the article "Adjustable speed AC drives—a technology status review" by B. M. Bose, published in the journal "Proceedings of the IEEE", Vol. 70, No. 2, Feb. 1982. Generally, such a control system generates a frequency control signal from the torque control signal, with the requested torque being compared with the torque developed by the motor as determined by measuring the motor voltages and currents, in order to provide a torque error signal which is then processed in order to derive a frequency difference signal which is then added to a frequency representing rotation of the rotor in order to provide a frequency control signal. Simultaneously, the flux in the motor is observed relative to a constant reference flux value, and is used to determine the voltage control signal. Such a circuit comprising two independent control loops is neither accurate nor stable and it is incapable of getting close to optimum efficiency.

The object of the present invention is to provide a vector control system for a squirrel-cage asynchronous electric motor that enables better efficiency and higher stability to be obtained.

SUMMARY OF THE INVENTION

The vector control system of the invention for a squirrel-cage asynchronous electric motor comprises means for evaluating the modulus or vector magnitude and the phase of at least one of the fluxes in the motor relative to a fixed frame of reference, means for evaluating first in-phase angle or argument and quadrature components relative to said flux of at least one of the currents supplied to the motor, means for evaluating the speed of rotation of the motor, and means for evaluating the DC motor feed voltage. The system further comprises means for determining second in-phase and quadrature components relative to said flux in the motor, and defining a control voltage as a function at least one of said first components and a requested torque value. It also comprises means for converting said second components into a corresponding polar representation having a modulus or magnitude and an argument or phase angle, with the modulus being supplied directly to said pulse generator in order to control the amplitude of the voltage supplied to the motor, while the argument is supplied to a phase control module which also receives said flux phase and a phase value of the voltage produced by the pulse generator, and which establishes a frequency correction value which is added to a stator frequency value in order to constitute the frequency control signal transmitted to the pulse generator in order to control the frequency of the voltage supplied thereby to the motor in such a manner that the difference between said flux phase and said phase value tends to become equal to said argument.

Said requested torque may be expressed in the form of a requested flux value and a requested value of said first quadrature component of the current supplied to the motor, and said second in-phase voltage component is determined from the difference between said modulus of the flux in the motor and said requested flux value, and the said second quadrature voltage component is determined from the difference between said quadrature component of the current supplied to the motor and said value requested for the first quadrature component of the current supplied to the motor, each of said determinations being performed by a respective proportional, integral, and/or differential regulator.

Each of said determinations may include a correction of the component produced as a function of values serving to determine the other components, such that the determination of one component is, as far as possible, accompanied by compensation for the effect of this determination on the value of the other component.

The said value of the frequency of the stator may be obtained by adding a frequency difference value determined from the said components to a frequency value which is derived from the rotation of the rotor.

BRIEF DESCRIPTION OF THE DRAWINGS

An embodiment of the invention is described by way of example with reference to the accompanying drawings, in which.

DETAILED DESCRIPTION

The asynchronous motors to which the invention applies are generally three-phase motors. The control system of the invention processes values relating to one of the power supply phases of the motor. It generates control signals and delivers them to a generator of width-modulated pulses MLI, which receives these control signals and delivers three trigger signals Fsmot corresponding to three three-phase AC voltages to an inverter OND which feeds power to the motor M. The generator MLI thus receives a control signal Mod which defines the amplitude of the three-phase voltage to be delivered to the motor (as a percentage of a DC power feed Uf, for example). It also receives a control signal Fsmli which defines the frequency of the three-phase AC voltage to be delivered to the motor.

The control system of the invention is associated in conventional manner with means responsive to the inputs of the motor for obtaining values for the currents Is1 to Is3 and for the voltages Vs1 to Vs3 delivered by the inverter on each of the three phases, together, where appropriate, with means for obtaining the values of the magnetizing voltages Um1 to Um3 delivered by flux turns disposed in the motor. Further, a value Fr is also obtained from the motor characteristic of the speed of rotation of the rotor.

Figure 2:
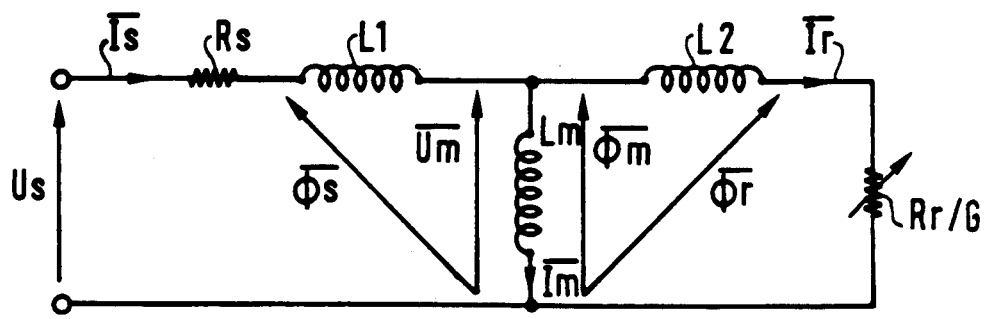
FIG. 2 is an equivalent electric circuit of the motor, valid for steady conditions only, and for any one of its three phases.

The equivalent electric circuit of the motor, under steady conditions only, and for each of its phases, is shown in FIG. 2. The voltage Us generates a current $\overline{Is}$ producing a stator flux $\Phi s$, which, after deduction of losses $L1.\overline{Is}$, provides the magnetizing flux $\Phi m$. This is the flux which is evaluated by the above-mentioned flux turn and which is converted into a voltage $\overline{Um}$. The rotor current $\overline{Ir}$ is derived from the stator current $\overline{Is}$ and induces the rotor flux $\Phi r$ which, after deducting losses $Lr.\overline{Ir}$, also provides magnetizing flux $\Phi m$. The ohmic resistance of the stator is represented as Rs in series with the leakage inductance L1 and the magnetizing inductance Lm. The rotor resistance is written Rr/G. It is variable and inversely proportional to the slip G.

Figure 3:
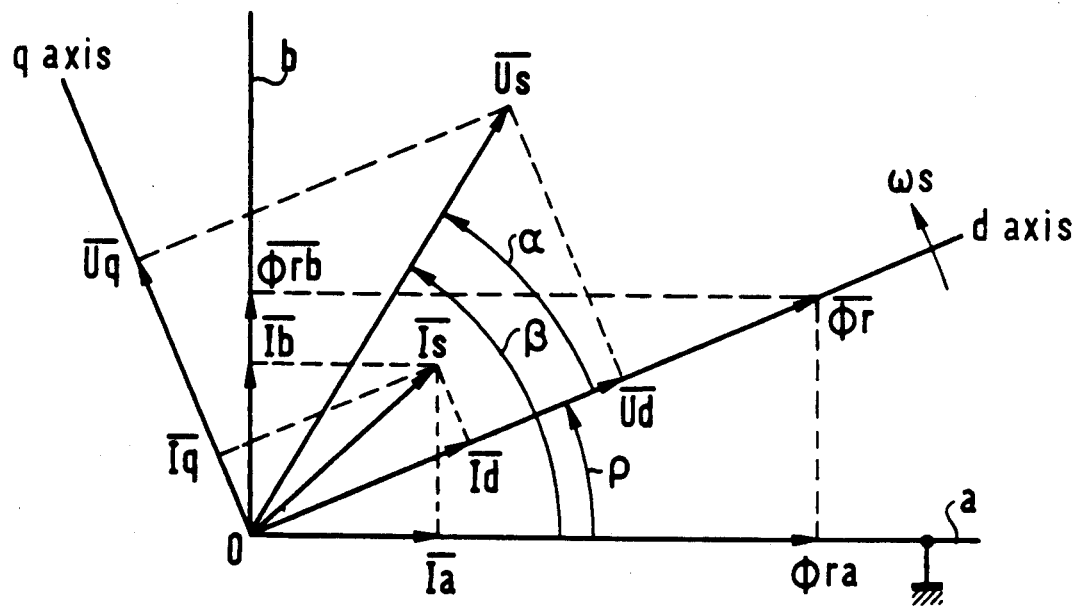
FIG. 3 is a vector diagram showing the fields, currents, and voltages applicable to the equivalent circuit of FIG. 2.

The diagram of FIG. 3 represents the flux $\Phi r$ rotating at the speed ws relative to a fixed reference aOb. The projections of $\Phi r$ on the axes Oa and Ob are represented by $\Phi ra$ and $\Phi rb$. The angle between the flux vector $\Phi r$ and the axis Oa is $p$. The current vector $\overline{Is}$ and the voltage vector $\overline{Us}$ are also shown in FIG. 3, together with their projections $\overline{Id}$, $\overline{Ud}$ and $\overline{Iq}$, $\overline{Uq}$ on an axis Od which is colinear with the vector $\Phi r$ and Oq which is in quadrature therewith. The components $\overline{Ia}$ and $\overline{Ib}$ of the current $\overline{Is}$ in the fixed frame of reference are also shown.

Figure 1:
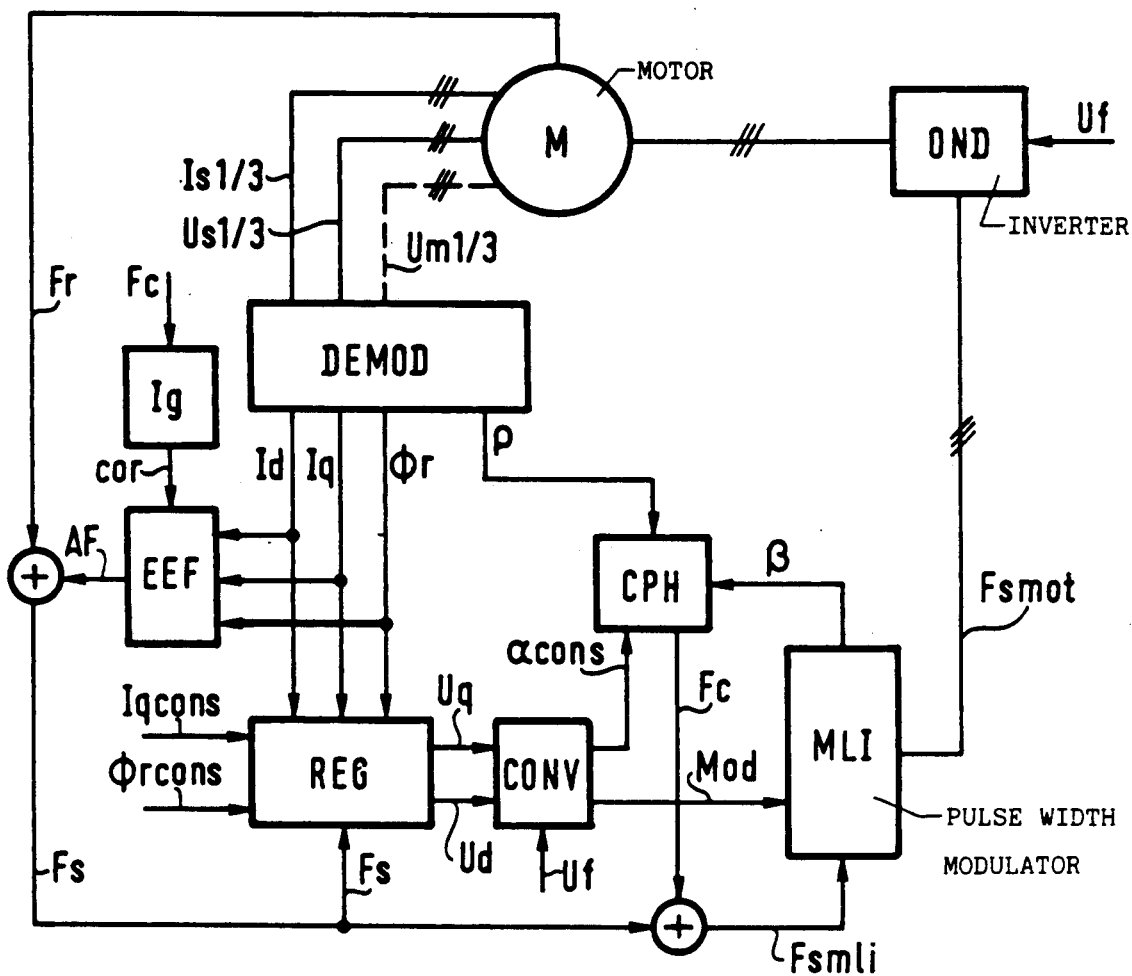
FIG. 1 is a block diagram of a vector control system of the invention for a squirrel-cage electric motor.

With reference now to FIG. 1, the instantaneous currents and voltages on the three phases, Is1/3 and Us1/3, and the instantaneous voltages from the flux turn enable a demodulation module DMOD to establish the values Id, Iq, $\Phi r$, and $\rho$. The values Id and Iq are the components of the currents Is in a frame of reference related to the flux $\Phi r$. The equations enabling the values of flux indicated in FIG. 2 to be obtained from the voltages Um1/3 provided by the flux turns are as follows:

$$\Phi m = \int Um\, dt$$

$$\Phi s = Um + L1 \cdot Is$$

$$\Phi r = \Phi m \cdot Lr/Lm - L2 \cdot Is$$

If there are no flux turns, the flux values can nevertheless be determined by means of the following equations:

$$\Phi s = \int (Us - Rs \cdot Is)\, dt$$

$$\Phi m = \Phi s - L1 \cdot Is$$

$$\Phi r = \Phi s \cdot Lr/Lm - (L2 + Lr \cdot L1/Lm) \cdot Is$$

Thus, the magnetizing fluxes $\Phi m1/3$ are obtained by integrating the voltages $\overline{Um}1/3$. A Fortescue transformation provides the components in the fixed frame of reference of FIG. 3:

$$\phi ma = \sqrt{1.5}\ \phi m1$$

$$\phi mb = \sqrt{0.5}\ (\phi m1 + 2\phi m2)$$

and from this the value of the modulus of the magnetizing flux vector can be obtained:

$$\phi m = \sqrt{\phi ma^2 + \phi mb^2}$$

In the same way, the components of the rotor flux in the fixed frame of reference are established using the formulas:

$$\Phi ra = (1 + L2/Lm)\Phi ma - L2 \cdot Ia$$

$$\Phi rb = (1 + L2/Lm)\Phi mb - L2 \cdot Ib$$

and the modulus of the rotor flux by:

$$\phi r = \sqrt{\phi ra^2 + \phi rb^2}$$

whereas the argument is provided by:

$$\rho = \text{Arccos}\,(\Phi ra/\Phi rb) \text{ or } \text{Arcsin}\,(\Phi rb/\Phi ra)$$

The in-phase and quadrature components of the current Is in the frame of reference linked to the vector $\Phi r$ is obtained from the currents Is1 and Is2, which provide the currents Ia and Ib by a Fortescue transformation as follows:

$$Ia = \sqrt{1.5} \; I1$$

$$Ib = \sqrt{0.5} \; (I1 + 2 \cdot I2)$$

Then, geometrically:

$$Id = (\Phi ra \cdot Ia + \Phi rb \cdot Ib)/\Phi r$$

$$Iq = (\Phi ra \cdot Ib - \Phi rb \cdot Ia)/\Phi r$$

The current components established in this way and the modulus of the rotor flux $\Phi r$ are delivered to a regulator module REG which also receives two values Iqcons and $\Phi$rcons. These values are derived in conventional manner from a manual torque control by a translator module which causes each requested value of torque to correspond to a value of rotor flux and a value of current in quadrature. The regulator module REG serves to ensure that these values are attained.

Figure 4:
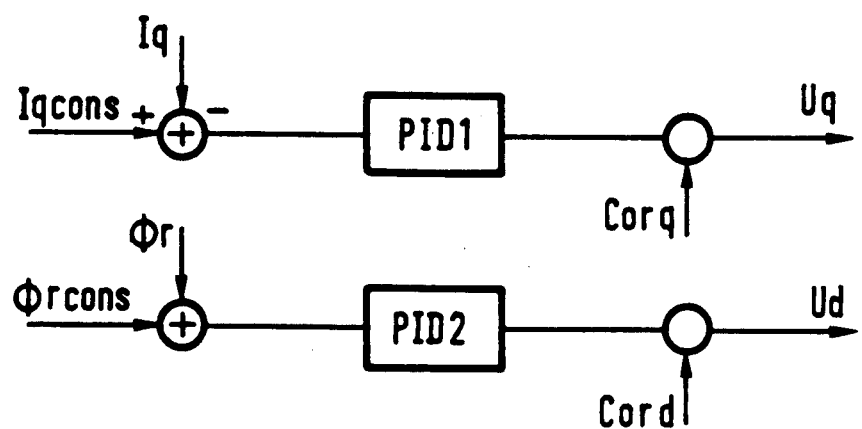
FIG. 4 is a block diagram of a particular embodiment of the regulation module REG in FIG. 1.

More particularly, the regulator module REG serves to generate components Uq and Ud (see FIG. 2) which, when combined, define the voltage vector $\overline{Us}$ that should be applied to the motor. Since the generator MLI accepts only an amplitude control and a frequency control, the regulator module REG is followed by a coordinate converter stage CONV which causes each pair of values Uq and Ud to correspond to the modulus Mod of the vector Us and an argument $\alpha$cons defining said vector in the rotating frame of reference. FIG. 4 is a simplified block diagram of the operations performed in the regulator module REG. It can be seen that the value of the component Iq observed on the motor is subtracted from the value of the quadrature current component Iqcons, with the difference being amplified, integrated and/or differentiated by a regulator stage PID1 in order to provide a value for the quadrature voltage component Uq, with the loop being in equilibrium when the quadrature component Iq observed on the motor is equal to the requested value Iqcons. Similarly, the modulus of the flux $\Phi r$ is substracted from the modulus of the requested flux $\Phi$rcons and the difference is amplified, integrated and/or differentiated in regulation stage PID2 in order to provide a voltage component Ud, with the loop being in equilibrium when the modulus of the flux in the motor is equal to the requested flux modulus.

After conversion in the stage CONV, the components Uq and Ud provide the control signal Mod which is the amplitude of the voltage to be supplied to the motor, together with the arguent $\alpha$cons which is the angle between this vector and the axis Od.

The motor feed voltage Uf is applied to the stage CONV and account is taken thereof when determining the control signal Mod.

The argument $\alpha$cons is applied to a phase calculating module CPH which also receives the angle $\rho$ which describes the position of the rotating frame of reference relative to the fixed frame, as observed on the motor, and the angle $\beta$ which is indicated by the generator MLI and which situates the voltage vector relative to the fixed frame of reference. At equilibrium:

$$\beta - \rho = \alpha cons$$

and the frequency correction signal Fc is zero.

In addition, motor slip may be evaluated as a frequency difference $\delta F$ which is equal to the difference between the frequency representative of the speed of rotation of the rotating field and a frequency which is representative of the rotation of the rotor. It is known that this frequency difference is a function of the ratio between the current components Ia and Id (or the angle of the modulus of the flux $\Phi r$ relative to the current). A module EEF receiving the components Id and Iq (or $\Phi r$) evaluates this frequency difference $\delta F$ by determining the ratio between the two components, weighted by an appropriate coefficient.

FIG. 1 also shows an input cor to the module EEF which receives a signal Fc via an integrator stage Ig. The signal Fc is an error signal. By integrating this error signal over a sufficiently long period of time, e.g. one minute, it is possible to detect systematic error due to wrong evaluation of the frequency difference $\delta F$. The signal provided to the input cor has the effect of causing the module EEF to correct such an error.

The speed of rotation of the rotor is directly obtained by a speed sensor providing a value Fr. By adding the above-described frequency difference thereto, a frequency value Fs is thus obtained which corresponds to the speed of rotation of the stator field. So long as the frequency correction signal Fc is zero, this value Fs is applied to the generator MLI in the form of a frequency control signal Fsmli which defines the frequency of the voltage applied to the motor M. The frequency difference signal $\delta F$ is such that slowing down of the motor tends to reduce the frequency delivered by the pulse generator MLI so that the angle between the current and flux remains limited.

When the signal Fc is not zero, it is added to the signal Fs and the signal Fsmli is modified in a direction such that the argument $\rho$ of the motor flux tends to maintain itself at an angle equal to $\alpha$cons relative to the angle of the voltage applied to the motor.

The various modules constituting the vector control system of the invention can each be constituted in the form of an independent processor, or in the form of a processing cell within a processor implementing all of the modules shown. The integration operations performed on the voltages observed at the inputs to the motor may be performed in analog manner. Thereafter, and preferably, the analog values are sampled and converted into digital values. The calculations performed in the demodulation module DEMOD for establishing the values Id, Iq, and Or, and the calculations performed in the regulation module REG and the conversion module CONV for establishing the modulus and the argument of the voltage vector to be produced relative to the rotating frame of reference are all performed periodically. The repetition rate need only be a few complete cycles per second. The control signal Mod is therefore updated at this rate. The signal Fr which measures the speed of rotation of the motor may be established at a much higher repetition rate. The frequency difference $\delta F$ is applied thereto at the operating rate of the modules DEMOD and EEF. The resulting signal Fs may be modified at the same rate by the frequency correction signal Fc produced by the module CPH in order to provide the frequency control signal Fsmli.

I claim:

1. A vector control system for a squirrel-cage asynchronous electric motor powered by a width-modulated pulse generator controlling an inverter which converts a DC feed voltage into at least one AC feed voltage applied to the asynchronous motor, said AC voltage having an amplitude defining a current supplied by the generator to the motor and a flux in the motor, said system comprising means for evaluating magnitude and phase of flux in the motor relative to a fixed frame of reference, means for evaluating first in-phase and quadrature components, relative to said flux in the motor, of the current supplied to the motor, means for evaluating the speed of rotation of the motor, and means for evaluating the DC motor feed voltage, wherein the system further comprises means for determining second in-phase and quadrature components relative to said flux in the motor, which define a control voltage as a function of said first components and of a requested torque value, and wherein the system also comprises means for converting said second components into a corresponding polar representation having a magnitude and phase angle, with the magnitude of said polar representation being supplied directly to said pulse generator in order to control the amplitude of the AC feed voltage applied to the motor, while the phase angle of said polar representation is supplied to a phase control module which also receives said flux phase and a phase value of the voltage produced by the pulse generator, and which establishes a frequency correction value which is added to a stator frequency value to constitute a frequency control signal transmitted to the pulse generator to control the frequency of the AC voltage supplied thereby to the motor, in order that the difference between said flux phase and said phase value tends to equal said phase angle of said polar representation.

2. A vector control system for a squirrel-cage asynchronous electric motor in accordance with claim 1, wherein said requested torque is expressed in the form of a requested flux value and a requested value of said first quadrature component of the current supplied to the motor, said second in-phase voltage component is determined from the difference between said magnitude of the flux in the motor and said requested flux value, and said second quadrature voltage component is determined from the difference between said quadrature component of the current supplied to the motor and said requested value of said first quadrature component of the current supplied to the motor, each of said determinations generating a respective component from the above-mentioned parts performed by a respective proportional, integral, and/or differential regulator.

3. A vector control system for a squirrel-cage asynchronous electric motor in accordance with claim 2, wherein first of said determinations generating a first component includes a correction of said first component as a function of factors taken into account in the other determination and vice versa, such that the determination of one component is, as a far as possible, accompanied by compensation for the effect of this determination on the component resulting from the other determination.

4. A vector control system for a squirrel-cage asynchronous electric motor in accordance with claim 1, wherein the said value of the frequency of the stator current is obtained by adding a frequency difference value determined from the said in-phase and quadrature components of the current supplied to the motor to a frequency value which is derived from the rotation of the rotor.

* * * * *